United States Patent
Marriott et al.

(10) Patent No.: US 6,302,437 B1
(45) Date of Patent: Oct. 16, 2001

(54) VEHICLE GLOVE BOX ASSEMBLY HAVING KNEE RESTRAINT CAPABILITIES

(75) Inventors: Brandon S Marriott, West Bloomfield; William F Diss, Shelby Township, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/544,419

(22) Filed: Apr. 6, 2000

(51) Int. Cl.[7] .................................................. B60R 21/16
(52) U.S. Cl. ........................................ 280/732; 280/728.3
(58) Field of Search ................................. 280/728.3, 732, 280/752

(56) References Cited

U.S. PATENT DOCUMENTS

| | | |
|---|---|---|
| 4,427,215 | 1/1984 | Weichenrieder et al. ............ 280/752 |
| 5,071,162 | 12/1991 | Takagawa ............................. 280/752 |
| 5,158,323 * | 10/1992 | Yamamoto et al. .................. 280/735 |
| 5,190,314 | 3/1993 | Takasugi ............................... 280/752 |
| 5,308,111 | 5/1994 | Sommer ............................. 280/728.3 |
| 5,413,379 | 5/1995 | Koma ................................... 280/752 |
| 5,476,283 | 12/1995 | Elton ................................... 280/753 |
| 5,536,043 | 7/1996 | Lang et al. .......................... 280/753 |
| 5,816,613 | 10/1998 | Specht et al. ....................... 280/752 |
| 5,865,468 | 2/1999 | Hur ...................................... 280/752 |
| 5,876,061 | 3/1999 | Stavermann ......................... 280/732 |
| 5,882,037 | 3/1999 | Bauer et al. ......................... 280/748 |
| 5,931,520 | 8/1999 | Seksaria et al. ...................... 296/70 |
| 5,934,733 | 8/1999 | Manwaring ........................... 296/72 |

* cited by examiner

Primary Examiner—Kenneth R. Rice
(74) Attorney, Agent, or Firm—Mark P. Calcaterra

(57) ABSTRACT

A unique glove box and restraint system including a reaction bracket is provided. The glove box assembly includes a reaction bracket that is attached to a hinge mechanism. The reaction bracket carries a storage bin, a latch, a trim plate, a tether, and a gas source. The gas source is held in an operative relationship with an inflatable air bag. The inflatable air bag is coupled to the trim plate. The trim plate includes an outer panel and an inner attachment plate. The inner attachment plate is selectively coupled to the reaction bracket by a mechanism that disengages when it experiences an outward force greater than a predetermined amount. The latch is connected to the reaction bracket at the end opposing the hinge. During conditions of rapid deceleration, the gas source produces gas to inflate the air bag if electrical current is sent to trigger the gas source by the vehicle crash sensing system. As the air bag fills force is exerted on the trim plate, thereby disengaging the trim plate from the reaction bracket and projecting it outward. The air bag pushes off the reaction bracket to project itself outward being directed by the orientation of the gas source and by at least one tether. Upon deployment of the air bag, the storage bin portion of the glove box remains in place while the air bag and trim panel act to improve occupant safety.

38 Claims, 4 Drawing Sheets

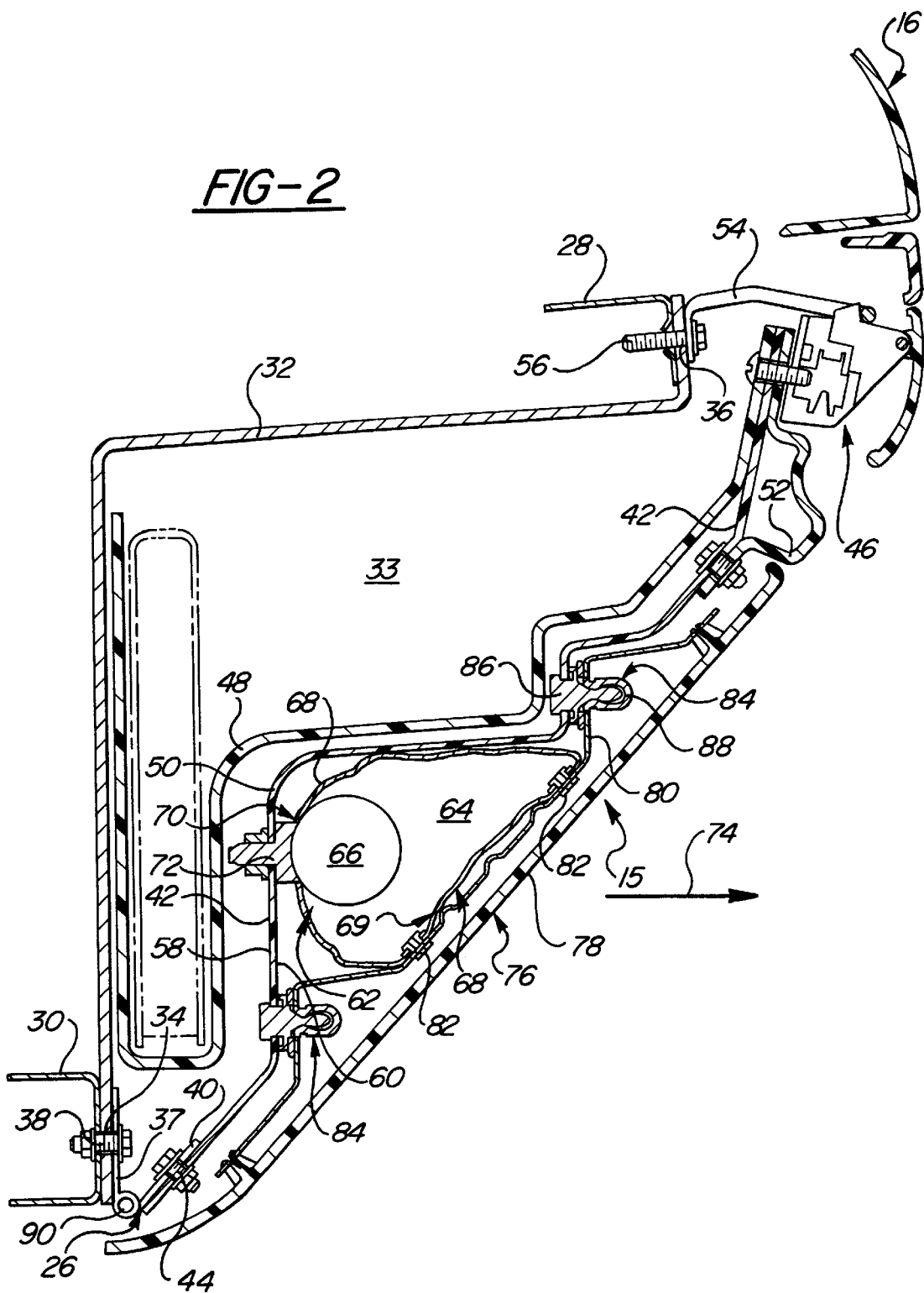

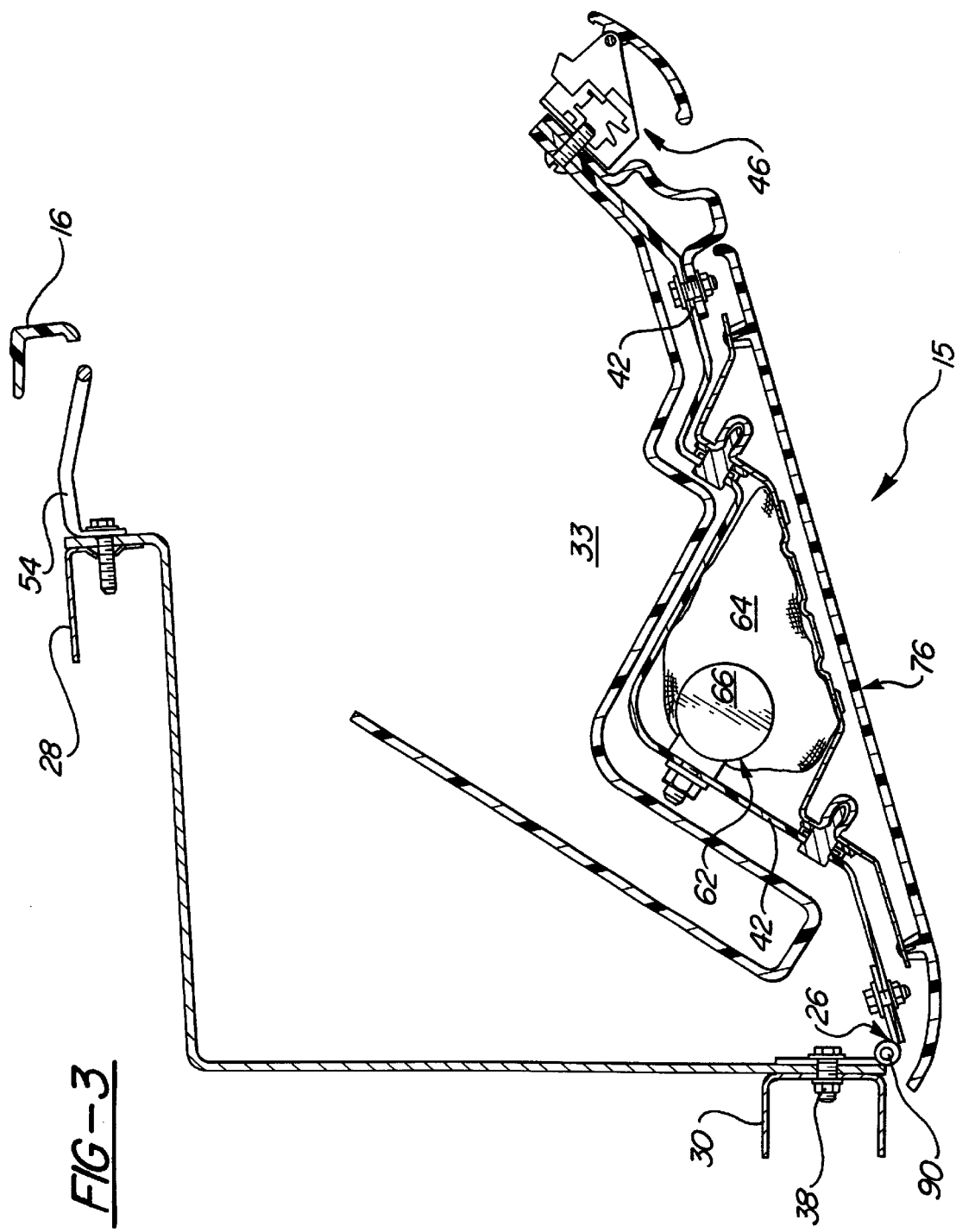

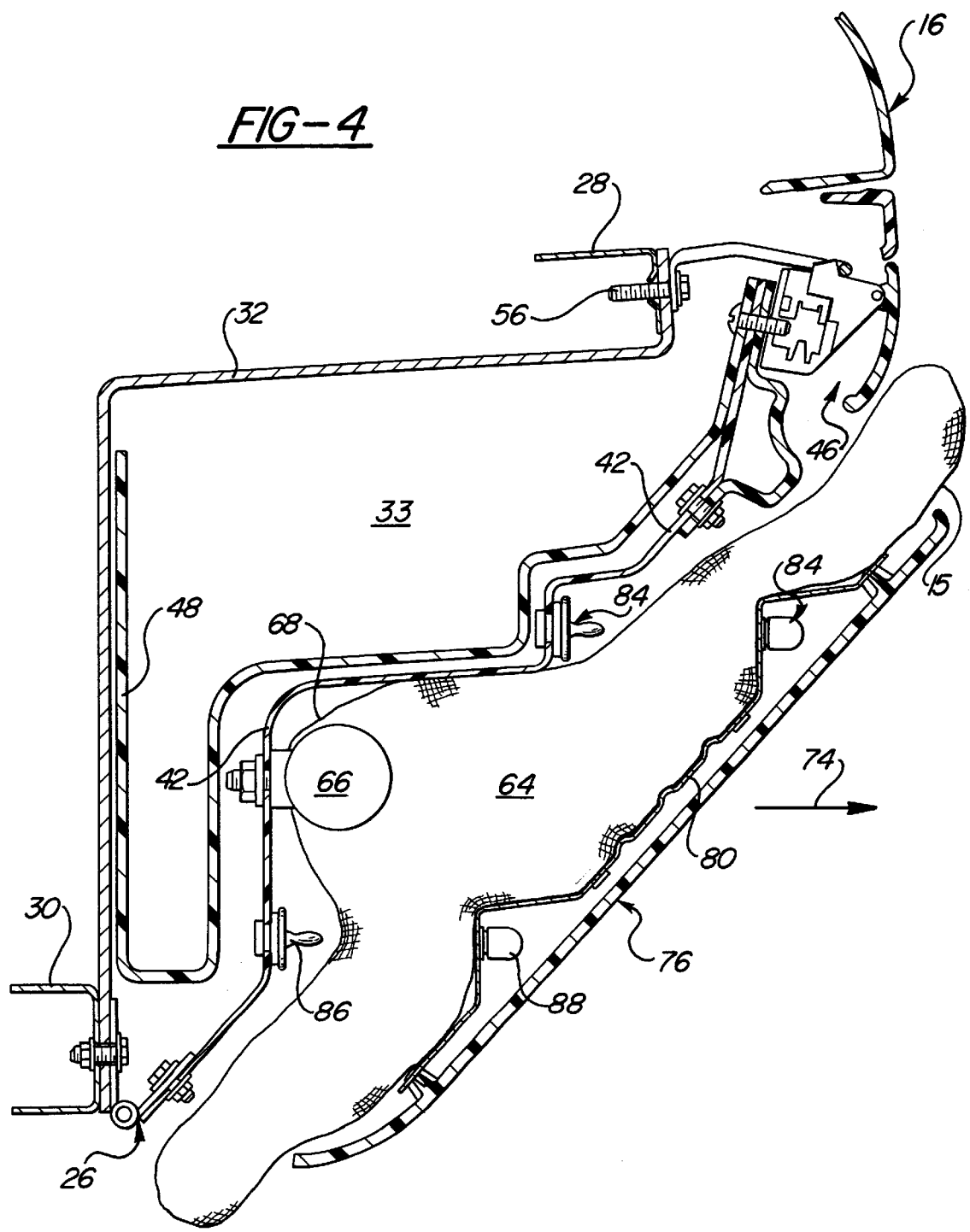

VEHICLE GLOVE BOX ASSEMBLY HAVING KNEE RESTRAINT CAPABILITIES

BACKGROUND OF THE INVENTION

1. Technical Field

The present invention relates in general to motor vehicle safety systems. More specifically, but without restriction to the particular embodiment and/or use which is shown and described for purposes of illustration, the present invention relates to an airbag apparatus adapted for use in conjunction with a glove box for occupant knee protection in a motor vehicle.

2. Discussion

Automobiles have incorporated many safety systems into their design over the years to help protect the occupants during various types of collisions. The seatbelt, which keeps occupants securely fastened to their seat, was and arguably still is the most prevalent safety device in the industry.

In recent years, however, both the government and the automotive industry realized the advantages that an inflatable occupant restraint system or airbag system could provide. The drive to develop and implement such a system was so strong that within just a few years almost all vehicles included inflatable occupant restraints that protected occupants during frontal collisions. The traditional frontal air bag is disposed in the steering wheel or the instrument panel of a vehicle and acts to protect the head, chest, and pelvic area of a front passenger during the sudden deceleration caused by an accident. During an accident, however, the lower torso of the passenger may slide forward on the seat in some types of vehicles especially if a seat belt is not worn. This condition may raise the possibility of injury to the lower extremities such as the knee and lower leg area, as well as the upper torso of the occupant due to knee intrusion into the instrument panel. It is known to provide a restraint for limiting this type of movement, commonly referred to as a 'knee-blocker'. One such example is exemplified in U.S. Pat. No. 5,816,613 entitled "Knee Restraining Device for Vehicles." This patent discloses an inflatable device that is directed toward the lower extremities of the passenger to aid in limiting lower torso translation forward along the vehicle seat. The general concept of providing an inflatable device to act as a 'knee-blocker' as done in the '613 patent is also illustrated in U.S. Pat. No. 5,536,043 entitled "Air Bag Activated Knee Bolster."

While such inflatable devices work satisfactorily to limit lower torso movement, they are not always easy to package in a vehicle. On the driver's side of the vehicle, it is possible to package an inflatable 'knee-blocker' without dramatically changing consumer comfort. However, on the passenger side of the vehicle, the insertion of an inflatable 'knee-blocker' would require some changes in customer comfort, such as either a downsizing, relocating, or eliminating the glove box or decreases the distance between the seat and the instrument panel available for ingress/egress. Many consumers have come to expect a reasonably sized glove compartment in the front on the passenger to store various items and a certain amount of interior spaciousness in their vehicles. Therefore, changing what customers have come to expect is not always desirable.

In response to these traditional shortcomings of an inflatable knee bolster, many automobile manufacturers have employed other means to provide the necessary lower torso restraint without sacrificing customer comfort. One such alternative is to use a stationary panel as a portion of the instrument panel to provide a 'knee-blocker.' This is not always acceptable because the reduction in space between the stationary panel and the occupant's knees diminishes the legroom of the vehicle and the feeling of roominess that many customers prefer. One alternative to the stationary panel is employed in U.S. Pat. No. 5,876,061 entitled "Knee Protection System for the Front Passenger in a Passenger Car." This patent illustrates an inflatable air bag that deploys through the opening of a glove box. The force of the air bag causes the glove box to open and move toward the lower extremities of the occupant. Another similar alternative is illustrated in U.S. Pat. No. 4,427,215 entitled "Passive Lower Body Restraint For Automotive Vehicles," which also calls for the glove box door to open in order to act as a 'knee-blocker' in rapid deceleration situations. Both of these alternatives, although satisfactory may experience complications of having a glove box open during a collisions. A glove box typically includes many various articles that may be expelled during a collision and the ability to open a glove box via a hinge designed for a specific amount of travel could be extremely difficult.

As is evident from an analysis of the aforementioned prior art, the ability to meet occupant protection goals contemporaneously with customer satisfaction goals does not exist in the prior art. There is, therefore, still an ever-pressing need to provide a workable glove box on the passenger side of a vehicle while providing an inflatable 'knee-blocker.' There is also a need to provide a glove box that is not designed to open during rapid deceleration while providing adequate restraint to the lower torso area of an occupant.

SUMMARY OF THE INVENTION

Accordingly, it is the principal objective of the present invention to provide an inflatable air bag system cooperative with a workable glove box to limit lower torso movement of the occupant of a vehicle during certain types of collisions.

It is another objective of the present invention to provide a glove box pivotal about a horizontal axis incorporating a gas source and an inflatable air bag in the folded condition incorporated therein.

It is yet another objective of the present invention to provide an inflatable air bag in the folded condition and a gas source attached to the instrument panel and pivotal about a horizontal axis.

It is a further objective of the present invention to provide a glove box having a trim panel that separates during conditions of rapid deceleration. The trim plate being secured to an inflatable air bag such that deployment of the air bag will cause the trim plate to project outward from the instrument panel in a direction rearward in vehicle.

It is an additional objective of the present invention to provide a glove box door having an internal reaction bracket that extends substantially from the hinge line to the latch portion of the glove box door to provide a strong surface capable of resisting the force exerted thereon by the deployment of the air bag. The glove box door also carries a storage bin that is substantially unaffected by the deployment of the air bag.

In one form, the present invention concerns an air bag that is disposed within a glove box assembly. The glove box assembly includes a reaction bracket that is attached to a hinge mechanism. The reaction bracket carries a storage bin, a latch, a trim plate, a tether, and a gas source. The gas source is held in an operative relationship with an inflatable air bag. The inflatable air bag is coupled to the trim plate. The trim plate is selectively coupled to the reaction bracket by a mechanism that disengages when it experiences an outward force greater than a pre-determined amount. The latch is connected to the reaction bracket at the end opposing the hinge. During conditions of rapid deceleration, the gas source produces gas to inflate the air bag. As the air bag fills, force is exerted on the trim plate, thereby disengaging the trim plate from the reaction bracket and projecting it outward, rearward in vehicle. The air bag pushes off the reaction bracket to project itself outward and is directed by the orientation of the gas source and by at least one tether. In the preferred embodiment of the present invention, one tether is employed having two anchorage points to the air bag, thereby directing the path of deployment of the air bag toward the uppermost tether anchorage point.

The hinge is attached to a structural support member disposed within the instrument panel. The latch of the glove box assembly cooperates with a striker also attached to a structural support member disposed within the instrument panel. The reaction bracket interconnects the hinge and the latch, thereby providing a structural support for the inflating air bag. The reaction bracket is designed such that it maintains its structural integrity when subjected to the force of inflatable air bag deploying therefrom. The latch and striker mechanism is designed to remain engaged in the closed position during the deployment of the air bag.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be written in conjunction therewith, and like reference numerals are employed to designate identical components in various views.

FIG. 2 is a cross-sectional view of the preferred embodiment of the present invention along the line 2—2 of FIG. 1.

FIG. 3 is a cross sectional view of the preferred embodiment of the present invention along the line 2—2 of FIG. 1 with the glove box disposed in the open position.

FIG. 4 is a cross-sectional view of the preferred embodiment of the present invention along the line 2—2 of FIG. 1 with the inflatable air bag deployed.

DETAILED DESCRIPTION OF THE PREFERRED EMBODIMENT

Figure 1:
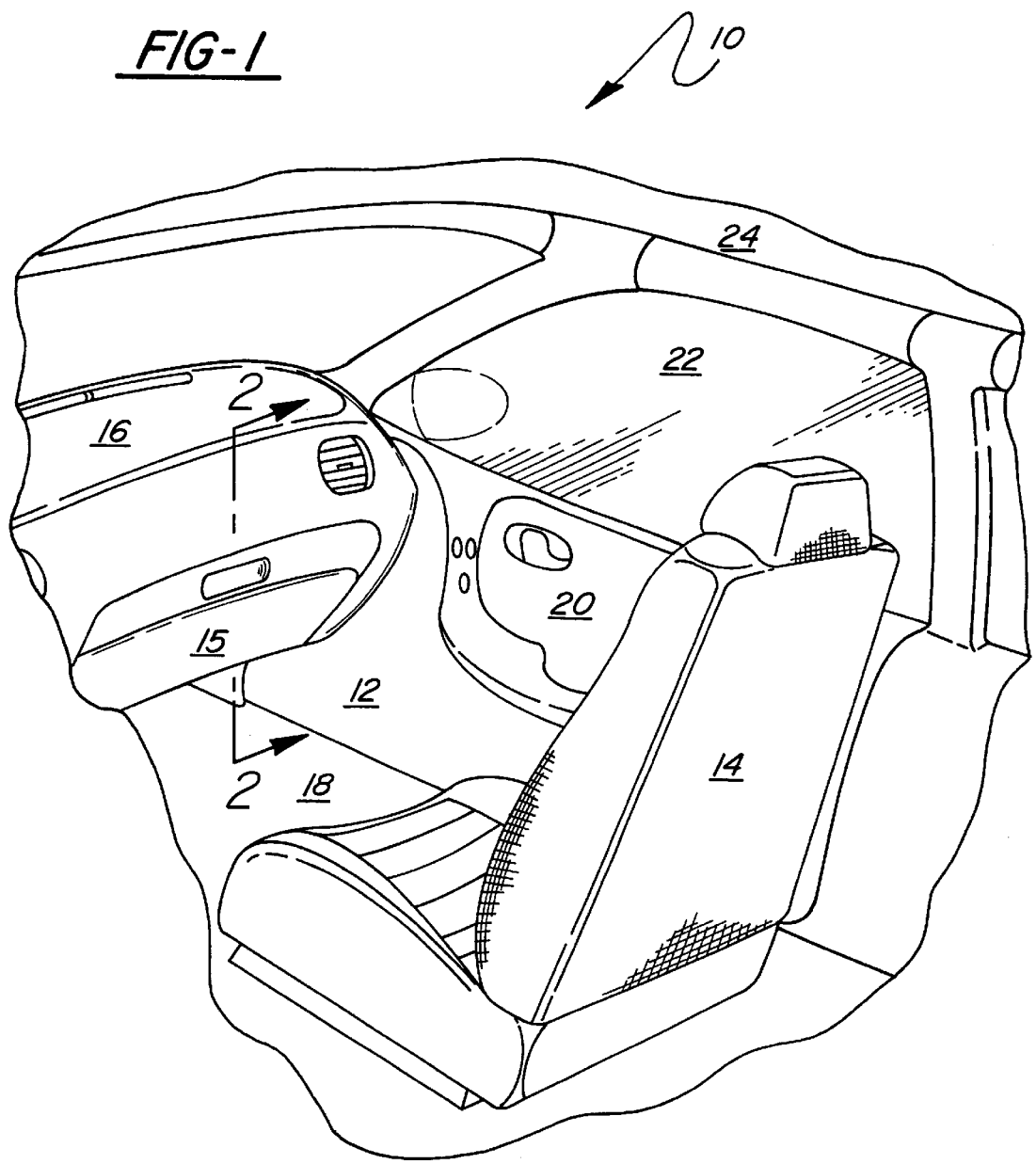
FIG. 1 is a perspective view of a vehicle interior showing the passenger side, front seat and associated instrument panel and glove box.

An apparatus comprising a glove box assembly having an inflatable air bag system is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Referring now to the drawings, FIG. 1 illustrates a perspective view of a vehicle 10, which includes the airbag system of the present invention. Vehicle 10 includes an interior 12, which includes among other things, a front passenger seat 14 and instrument panel 16 disposed forward thereof Instrument panel 16 includes a storage compartment 15 commonly referred to as a 'glove box.' Vehicle interior 10 also includes a vehicle floor 18 that defines the lowermost boundaries of the vehicle interior 12. The lateral boundaries of the vehicle interior 12 are formed by a front vehicle door 20 and a front vehicle door window 22 that extends upward from vehicle door 20 and can be reversibly translated in a vertical manner. Vehicle interior 12 is bounded on the upwardmost surface by headliner 24 which extends substantially from vehicle window 22 on the right side of the vehicle to the vehicle window (not shown) on left side of the vehicle.

Turning to FIG. 2, a cross-sectional view of the preferred embodiment of the present invention is illustrated, wherein the glove box 15 of the instrument panel 16 is described in detail along cross-sectional line 2—2 of FIG. 1. The instrument panel 16 and glove box 15 are disposed substantially rearward in vehicle (to the right in FIG. 2) of an upper structural support member 28 and a lower structural support member 30. The structural support members 28 and 30 are preferably supports anchored securely to a cross car beam which are employed to add strength and rigidity to both the vehicle 10 as well as the instrument panel 16. A backing plate 32 acts as a glove box housing or surround and interconnects the lower 30 and upper 28 structural support members and is adapted to ensure that items are retained within the storage bin 33 of the glove box 15 and are not lost behind the instrument panel 16. The backing plate 32 is preferably constructed of a thermoplastic material and includes a first and second clearance hole 34, 36 disposed on opposing ends thereof for attachment purposes. A pivotable hinge 26 is fixedly secured on its first leaf 37 to the lower structural support member 30 via a fastening mechanism 38 such as a bolt. The fastening mechanism 38 also extends through the first clearance hole 34 of the backing plate 32 thereby securing hinge 26, backing plate 32 and lower structural support member 30 together. The second leaf 40 of hinge 26 is secured to a reaction bracket 42 via a second fastening mechanism 44. The reaction bracket 42 is formed in an upward and outward direction and interconnects the hinge 26 near the bottom end thereof and the latch 46 of the glove box 15 near the top end thereof The reaction bracket 42 also carries the compartment structure 48 that defines the storage bin 33. The reaction bracket 42 is preferably made of a rigid material and carries the latch 46 that is preferably disposed in the lateral center of the glove box 15. The latch 46 is of a conventional type, but may need to upgraded to increase strength or size depending on the particular glove box configuration. The latch 46 is preferably attached to the reaction bracket 42 via a mounting member 52 that is attached by fasteners 53 to reaction bracket 42. The latch 46 cooperates with a striker 54 in a typical manner. Striker 54 is secured to the upper structural support member 28 via a fastening peg 56. The fastening peg 56 joins the upper structural support member 28, the striker 54, and the backing plate 32.

In the preferred embodiment, the reaction bracket 42 is constructed of 1010 steel having a thickness of 1.0–2.0 mm so that it commands a strength that is capable of handling the force exerted thereon by the deployment of the air bag 64. The reaction bracket 42 maintains its shape and integrity when subjected to a predetermined force. This predetermined force is the force exerted thereon during inflating of the inflatable air bag or cushion 64 operatively connected thereto. The reaction bracket 42 has a back side 58 and a front side 60. The back side 58 attaches to and carries the compartment structure 48 that defines the storage bin 33. The compartment structure 48 includes a well 49 that is disposed rearward of the inflatable air bag 64. Well 49 is significantly deeper than the other parts of storage bin and is adapted to receive the owner's manual 50 (shown in phantom) of the vehicle. The reaction bracket 42 also includes an air bag module 62 disposed on the front side 60 thereof. The air bag module 62 includes an inflatable bag 64, a gas source 66 adapted to inflate bag 64, a tether 68 and 70, and a mounting base 72. The mounting base 72 is affixed to the reaction bracket 42 such that the gas source 66 is disposed to produce gas in the direction indicated by arrow 74. The air bag or cushion 64 surrounds the gas source 66 and is preferably attached thereto but may also be attached to the reaction bracket 42. When not inflated, trim plate 76 conceals the air bag module 62 from sight. Trim plate 76 includes an aesthetically appealing 'A' surface or outer panel 78 and an inner attachment plate 80 connected thereto. The inner attachment plate 80 includes a plurality of attachments 82 to the inflatable bag 64. The attachments 82 preferably resemble rivets but any type of attachment scheme including adhesive and being integrally formed is within the scope and the breath of the present invention. The reaction bracket 42 and the trim plate 76 are attached by clips 84, but could also be standard fasteners designed to pull or break away through designed flaws in the trim plate 76. In the preferred embodiment, the male portion 86 of the clips 84 is attached to the reaction bracket 42 and the female portion 88 of the clips 84 is attached to the inner attachment plate 80 of the trim plate 76. Clips similar to those illustrated in cross section in FIG. 2 are commercially available from many manufacturers including TRW. The clips 84 are designed to disengage when a specified force is exerted thereon. The specified force being lower than the force created by the inflating air bag 64. To ensure proper disengagement and inflatable knee bolster function, the clips 84 most effectively disengage in a direction coinciding with the direction of the gas produced by the gas source 66 which is indicated generally by arrow 74.

Turning to FIG. 3, the glove box 15 is shown in the open position. When the latch 46 is disengaged from the striker 54, the glove box 15 swings open about the horizontal axis 90 defined by the hinge 26. This pivoting allows access to the storage bin 33 from a passenger situated in the vehicle interior 12. It should be appreciated that when the glove box 15 is open, the air bag module 62 moves therewith. Inflation of the bag 64 will be prevented while the glove box 15 is open via occupant sensors or a cut off switch to prevent firing.

FIG. 4 illustrates the preferred embodiment of the present invention with the air bag deployed. The bag 64 is inflated by the gas source 66. The desired deployment direction is indicated by arrow 74. The proper alignment of the gas source 66 and clips 84 assist the bag 64 to deploy in the direction of arrow 74. The construction of the glove box 15, however, may tend to deflect the bag 64 in a more downwardly direction. In order to compensate for this tether 68 is attached to the bag 64 at an upper anchorage point 70 secured to preferably the gas source 66 and a lower anchorage point 69. The tether 68 is disposed inside of bag 64 and is designed to urge the bag 64, trim plate 76 including the outer panel 78 and inner attachment plate 80 towards the deployment direction 74.

The gas source 66 is activated by electronic control dependent upon various conditions of the vehicle such as deceleration rate and occupant position. The gas source 66, therefore, is connected to the necessary vehicle sensors though a wire (not shown) having a durable coating that extends from the gas source 66 towards hinge 26 an into the instrument panel 16 to a connection that provides the air bag module with the desired triggering information.

The foregoing description constitutes the preferred embodiments devised by the inventors for practicing the invention. It is apparent, however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A restraint system for a motor vehicle having an instrument panel, comprising:

an inflatable air bag disposed within the motor vehicle, and a gas source adapted to inflate said inflatable air bag;

an element to which said gas source is attached, said element being moveably mounted to the instrument panel of the motor vehicle.

2. The restraint system as set forth in claim 1, wherein said element is hingedly attached to the instrument panel about a horizontal axis.

3. The restraint system as set forth in claim 2, wherein said element is a glove box assembly and comprises:

a reaction bracket having a first end and a second end, said gas source connected to said reaction bracket;

a hinge connected to said reaction bracket near said first end and interconnecting said glove box and the instrument panel of the vehicle; and a latch connected to said reaction bracket near said second end, said first end being substantially opposite from said second end.

4. The restraint system as set forth in claim 3, wherein said glove box assembly also includes a compartment structure defining a storage bin that is carried by said reaction bracket.

5. The restraint system as set forth in claim 3, wherein said reaction bracket is constructed from a rigid material capable to reacting the force created by said gas source while inflating said inflatable air bag.

6. The restraint system as set forth in claim 3, further comprising a trim plate selectively attached to said reaction bracket, said trim panel also being coupled to said inflatable air bag.

7. The restraint system as set forth in claim 6, wherein said trim plate is selectively attached to said reaction bracket by clips that are designed to disengaged when subjected to a predetermined force.

8. The restraint system as set forth in claim 7, wherein said predetermined force is set to be lower than the force of deployment of said inflatable air bag.

9. The restraint system as set forth in claim 8, wherein said latch is centrally located laterally in said glove box assembly.

10. The restraint system as set forth in claim 1, wherein said inflatable air bag has a tether disposed therein, said tether includes having an upper and lower attachment point, said upper attachment point disposed near said reaction bracket and said lower attachment point connects said tether and said inflatable air bag.

11. The restraint system as set forth in claim 3, wherein the instrument panel includes a structural support member, said hinge being secured to said structural support member at a first location, said striker also being secured to said structural support member at a second location above said first location.

12. A restraint system for a motor vehicle having an instrument panel, said restraint system comprising:
- a glove box assembly disposed within the instrument panel of the motor vehicle and being hingedly attached thereto and adapted to open and close; and
- an inflatable air bag disposed within the glove box assembly of the motor vehicle.

13. The restraint system as set forth in claim 12, wherein said glove box assembly includes a hinge interconnecting said glove box assembly and said instrument panel, said glove box assembly also includes a latch.

14. The restraint system as set forth in claim 13, wherein said glove box assembly includes a reaction bracket interconnecting said hinge and said latch and also includes a compartment structure defining a storage bin that is carried by said reaction bracket.

15. The restraint system as set forth in claim 14, further comprising a gas source adapted for inflating said inflatable air bag disposed within said glove box assembly, said gas source being attached to said reaction bracket, said reaction bracket being capable of resisting the force exerted by said gas source while inflating said inflatable air bag.

16. The restraint system as set forth in claim 15, wherein said reaction bracket is comprised of a rigid material and capable of substantially maintaining its integrity when subjected to a second predetermined force.

17. The restraint system as set forth in claim 16, wherein said second predetermined force is the force exerted by said gas source and said inflatable air bag while said gas source is inflating said inflatable bag.

18. The restraint system as set forth in claim 16, wherein said glove box assembly includes a trim plate coupled to said inflatable air bag.

19. The restraint system as set forth in claim 18, wherein said trim plate is selectively attached to said reaction bracket.

20. The restraint system as set forth in claim 19, wherein said trim plate includes an outer panel and an inner attachment plate.

21. The restraint system as set forth in claim 18, wherein said trim plate is designed to disengage from said reaction bracket when subjected to a first predetermined force.

22. The restraint system as set forth in claim 20, wherein said trim plate is selectively attached to said inner attachment plate by clips that are designed to disengaged when subjected to a first predetermined force.

23. The restraint system as set forth in claim 22, wherein said first predetermined force is set to be lower than the force of deployment of said inflatable air bag.

24. A restraint system for a motor vehicle comprising:
- a reaction bracket having a first and second end;
- a hinge connected to said reaction bracket near said first end;
- a latch connected to said reaction bracket near said second end, said first end being substantially opposite from said second end;
- an air bag module connected to said reaction bracket, said air bag module having a gas source and an inflatable air bag, said gas source adapted to inflate said air bag; and
- a trim plate selectively attached to said reaction bracket, said trim plate also being coupled to said inflatable air bag.

25. The restraint system as set forth in claim 24, wherein said trim plate includes an outer panel and an inner attachment plate, said inner attachment plate being selectively attached to said trim plate, said inner attachment plate also being coupled to said air bag.

26. A glove box assembly for a motor vehicle comprising:
- a reaction bracket having a first and second end;
- a hinge connected to said reaction bracket near said first end;
- a latch connected to said reaction bracket near said second end, said first end being substantially opposite from said second end;
- an air bag module connected to said reaction bracket, said air bag module having a gas source and an inflatable air bag, said gas source adapted to inflate said air bag.

27. The glove box assembly as set forth in claim 26 further comprising a trim plate selectively attached to said reaction bracket, said trim plate also being coupled to said inflatable air bag.

28. A restraint system for a motor vehicle having an instrument panel, said restraint system comprising:
- a glove box assembly disposed within the instrument panel of the motor vehicle and being hingedly attached thereto;
- an inflatable air bag disposed within the glove box assembly of the motor vehicle; and
- wherein said glove box assembly includes a hinge interconnecting said glove box assembly and said instrument panel, said glove box assembly also includes a latch.

29. The restraint system as set forth in claim 28, wherein said glove box assembly includes a reaction bracket interconnecting said hinge and said latch and also includes a compartment structure defining a storage bin that is carried by said reaction bracket.

30. The restraint system as set forth in claim 29, further comprising a gas source adapted for inflating said inflatable air bag disposed within said glove box assembly, said gas source being attached to said reaction bracket, said reaction bracket being capable of resisting the force exerted by said gas source while inflating said inflatable air bag.

31. The restraint system as set forth in claim 30, wherein said reaction bracket is comprised of a rigid material and capable of substantially maintaining its integrity when subjected to a second predetermined force.

32. The restraint system as set forth in claim 31, wherein said second predetermined force is the force exerted by said gas source and said inflatable air bag while said gas source is inflating said inflatable bag.

33. The restraint system as set forth in claim 31, wherein said glove box assembly includes a trim plate coupled to said inflatable air bag.

34. The restraint system as set forth in claim 33, wherein said trim plate is selectively attached to said reaction bracket.

35. The restraint system as set forth in claim 34, wherein said trim plate includes an outer panel and an inner attachment plate.

36. The restraint system as set forth in claim 33, wherein said trim plate is designed to disengage from said reaction bracket when subjected to a first predetermined force.

37. The restraint system as set forth in claim 35, wherein said trim plate is selectively attached to said inner attachment plate by clips that are designed to disengaged when subjected to a first predetermined force.

38. The restraint system as set forth in claim 37, wherein said first predetermined force is set to be lower than the force of deployment of said inflatable air bag.

* * * * *